(12) United States Patent
Reeves

(10) Patent No.: US 12,471,038 B2
(45) Date of Patent: Nov. 11, 2025

(54) POWER EFFICIENT BASE STATIONS

(71) Applicant: T-MOBILE INNOVATIONS LLC, Overland Park, KS (US)

(72) Inventor: Raymond Emilio Reeves, Orlando, FL (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 475 days.

(21) Appl. No.: 18/092,189

(22) Filed: Dec. 30, 2022

(65) Prior Publication Data

US 2024/0224193 A1    Jul. 4, 2024

(51) Int. Cl.
*H04W 52/02* (2009.01)
*H04W 52/22* (2009.01)
*H04W 52/28* (2009.01)
*H04W 52/42* (2009.01)

(52) U.S. Cl.
CPC ....... *H04W 52/283* (2013.01); *H04W 52/228* (2013.01); *H04W 52/42* (2013.01)

(58) Field of Classification Search
CPC ..... H04W 16/28; H04W 64/00; H04W 52/02; H04W 72/51; H04W 36/24; H04W 40/20
See application file for complete search history.

(56) References Cited

U.S. PATENT DOCUMENTS 10,863,366 B2 * 12/2020 Nagaraja ............ H04B 7/06952
11,438,129 B2 * 9/2022 Levitsky ................ H04W 52/42

* cited by examiner

*Primary Examiner* — Tu X Nguyen
(74) *Attorney, Agent, or Firm* — Shook, Hardy & Bacon L.L.P.

(57) ABSTRACT

Methods and systems for improving the power efficiency of base stations are provided herein. One or more entities of a telecommunication network utilize device location and device capability information relating to a device's ability to receive and process downlink signals as a basis for making transmission power decisions. Excess transmission power used to communicate downlink signals beyond the range of devices in a coverage area can be eliminated. In some cases, distant devices may be handed over to neighboring base stations with or without power modification to the neighboring base station.

14 Claims, 4 Drawing Sheets

POWER EFFICIENT BASE STATIONS

SUMMARY

The present disclosure is directed to managing transmission power of one or more base stations based on device location and capabilities, substantially as shown and/or described in connection with at least one of the Figures, and as set forth more completely in the claims.

According to various aspects of the technology, device location information and device capability information relating to a device's ability to receive and process downlink signals from a base station are used as at least as a partial basis for making base station transmission power decisions. Mobile network operators and related stakeholders are increasingly focused on power efficiency and conservation. For mobile network operators, one of the most impactful ways to reduce power consumption is by way of its base stations, which provide wireless telecommunication services to subscriber devices. Conventional solutions focus on managing transmission powers of base stations as a factor of their pre-set service area(s) or deactivating base stations when demand is below a threshold. Instead, the present disclosure is directed to modifying base station transmission power based at least in part on device location and device capabilities—providing energy savings at the base station while maintaining a minimum performance for subscriber devices.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present technology is described in detail herein with reference to the drawing figures, which are intended to be exemplary and non-limiting in nature, wherein.

DETAILED DESCRIPTION

Figure 1:
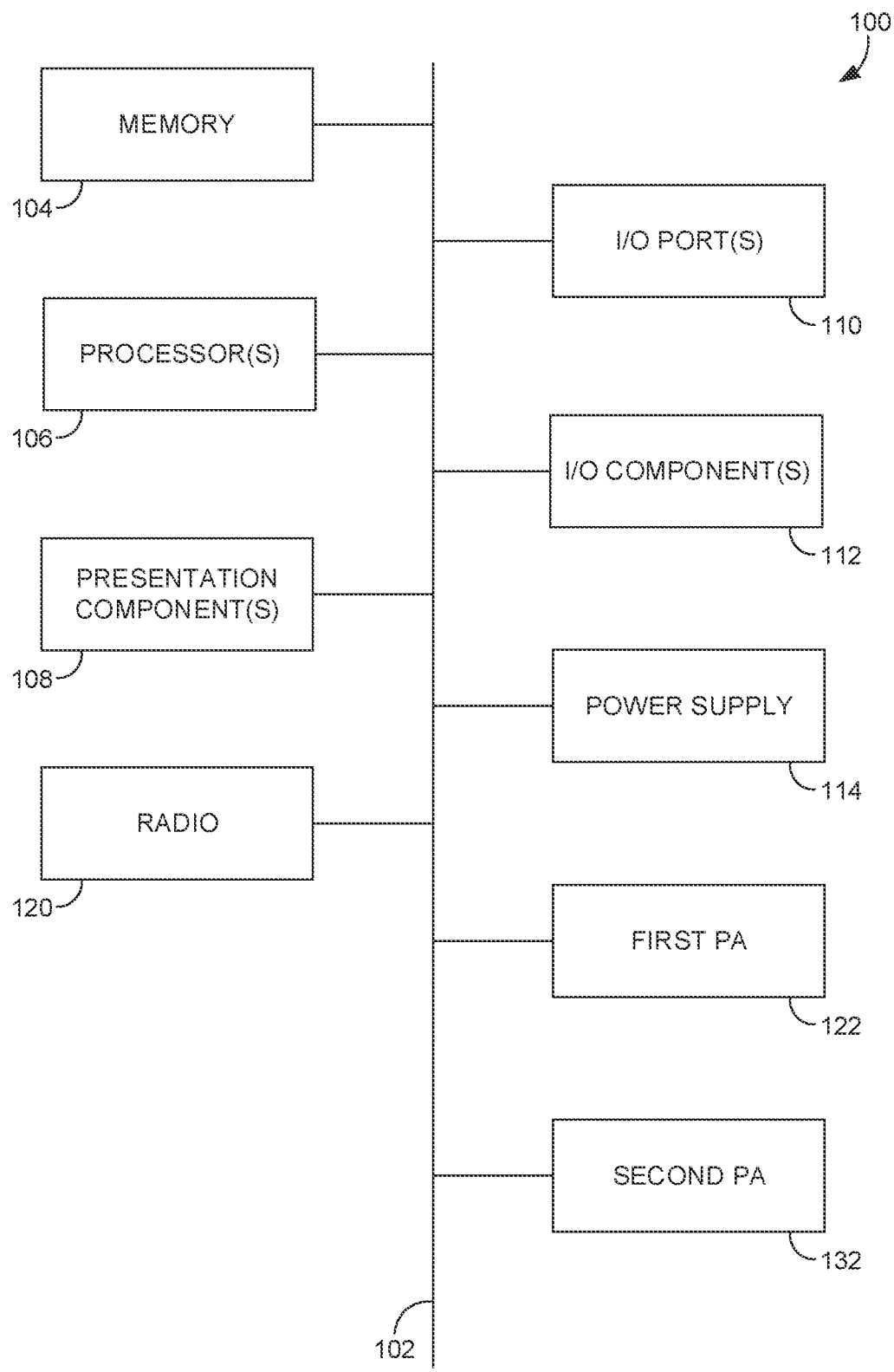
FIG. 1 depicts an exemplary computing environment suitable for use in implementation of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018). As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 802.11x, and the like. The term "mobile network operator" (MNO) is used to refer to an entity (e.g., a corporation) that provides networked connectivity to one or more UEs; examples of MNOs include wireless telecommunication carriers such as T-Mobile, AT&T, Verizon, and the like. The term "base station" is used in its generic and literal sense and refers to any terrestrial radio station that transmits and/or receives signals to/from one or more destinations (e.g., UEs); a macro cell, small cell, and femto cell are all considered a base station for the purpose of the present disclosure; a single base station may be configured to serve one or more sectors using one or more NATs on one or more carrier frequencies. Certain signal processing techniques that are known in the art are referred to by their acronyms, such as time division multiplexing (TDM), frequency division multiplexing (FDM), orthogonal frequency division multiplexing (OFDM), and code division multiplexing (CDM).

A "mobile device," as used herein, is a device that has the capability of using a wireless communications network, and may also be referred to as a "user device," "wireless communication device," or "user equipment (UE)." A mobile device may take on a variety of forms, such as a personal computer (PC), a laptop computer, a tablet, a mobile phone, a personal digital assistant (PDA), a server, or any other device that is capable of communicating with other devices using a wireless communications network. Additionally, embodiments of the present technology may be used with different technologies or standards, including, but not limited to, CDMA 1XA, GPRS, EvDO, TDMA, GSM, WiMax technology, LTE, and/or LTE Advanced, among other technologies and standards.

Embodiments of the technology may be embodied as, among other things, a method, a system, and/or a computer-program product. Accordingly, the embodiments may take the form of a hardware embodiment, or an embodiment combining software and hardware. In one embodiment, the technology may take the form of a computer-program product that includes computer-useable instructions embodied on one or more computer-readable media.

Computer-readable media may include both volatile media, non-volatile media, removable media, non-removable media, and contemplate media readable by a database, a switch, and/or various other network devices. Network switches, routers, and related components are conventional in nature, as are methods of communicating with the same.

By way of example, and not limitation, computer-readable media may include computer storage media and/or communications media. Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently.

Communications media typically store computer-useable instructions—including data structures and program modules—in a modulated data signal. The term "modulated data signal" refers to a propagated signal that has one or more of its characteristics set or changed to encode information in the signal. Communications media includes any information-delivery media. By way of example, but not limitation, communications media may include wired media, such as a wired network or direct-wired connection, and wireless media such as acoustic, infrared, radio, microwave, spread-spectrum, and other wireless media technologies. Combinations of the above are included within the scope of computer-readable media. Communications media do not include signals per se.

By way of background, there has been increased interest and pressure by MNOs and stakeholders to conserve/optimize energy expenditures of their large and complex telecommunication systems. Though power conservation at the user equipment (UE) level is one way to reduce overall system power consumption, an MNO only has so much control over how a subscriber utilizes their UE. Instead, making base stations more efficient is much more within an MNO's ability to control, and because of the prevalence of base stations, even modest power savings at each individual base station can equate to significant system-wide conservation. However, unlike power management decisions at the UE, bases station power decisions have the potential to impact many UEs, especially when implemented by macro cell sites which are typically configured to concurrently serve hundreds or thousands of devices. Accordingly, a power management solution, implemented at the base station and sensitive to the needs of UEs, could positively impact power consumption of a telecommunication network without disrupting its core functionality.

Often times, conventional base station operation does not include power conservation measures, and when they do, they are often (or at least potentially) disruptive. Today, many MNOs maintain a constant (or near-constant) transmission power of their base stations in order to provide wireless telecommunication coverage to areas that they have asserted to subscribers, government regulators, and/or other stakeholders. In such a case, an MNO may only deactivate a particular base station during maintenance periods or other similar times, wherein coverage is otherwise constantly maintained for the entirety of the pre-set coverage area. Conventionally, when an MNO does implement power conservation measures, they are often load-based. In at least some cases, an MNO will deactivate a base station when demand/load on that base station falls below a relatively low minimum; in that case, the MNO can have confidence that only some UEs that were served by the base station may be left without coverage. Unfortunately, modern solutions can negatively cause at least some UEs to be left without service. Especially for UEs located near a deactivated base station where neighboring base stations are not configured to reach, in some cases a UE that has been stranded by the deactivation of a low-load base station may be unable to attach to an alternate base station. Such a condition can cause unnecessary roaming to other mobile networks or, especially in more rural areas, cause an inability for UEs to connect to any network. In other words, conventional solutions, if implemented at all, can be imprecise and cause undesirable consequences for subscribers.

In contrast to conventional solutions, the present disclosure is directed to using device location and device capabilities of at least some UEs in a service area of a base station in order to optimize the transmission power of the base station. As will be discussed in greater detail herein, when a UE's location and capabilities are combined, it can be determined how maximally to reduce power without causing the UE to have its performance fall below a threshold. In other words, by understanding where UEs are located in a cell and their innate abilities to receive and process downlink signals, a base station can reduce its power without causing any UEs to lose service. In some aspects, overall system power consumption can be determined and the transmission powers of more than one base station can be adjusted in tandem, decreasing transmission power at a first base station by an amount, which might cause a UE to become unsatisfactorily unserved but for a lesser increase in the transmission power of a second base station, to which the UE can attach. That is, instead of conventional blank power management decisions based on loading, the present disclosure increases base station power efficiency without causing UEs to lose service.

Accordingly, a first aspect of the present disclosure is directed to a method for improving power efficiency of base stations. The method comprises determining device location information of at least a portion of one or more user devices served by an access point emitting a first beamform. The method further comprises accessing device capability information associated with at least a portion of the one or more user devices served by the access point. The method further comprises determining a second beamform based on the device location information and the device capability information such that when the second beamform is emitted from the base station, (a) the base station consumes less power compared to an amount of power consumed by the base station when emitting the first beamform and (b) one or more network parameters associated with a device of the plurality of user devices exceed a predetermined threshold. The method further comprises emitting the second beamform from the base station.

Another aspect of the present disclosure is directed to one or more non-transitory computer storage media storing computer-usable instructions that, when executed by one or more processors, cause the one or more processors to perform a method for improving the power efficiency of a base station. The method comprises training a machine learning model using user device location data. The method further comprises predicting, using the machine learning model, an amount of transmission power needed by a base station such that, when one or more downlink signals are transmitted by the base station to a user equipment (UE), one or more network parameters of the downlink signal as observed by the UE exceeds a predetermined threshold. The method further comprises transmitting the one or more downlink signals to the UE using the amount of transmission power.

Yet another aspect of the present disclosure is directed to a system for improving power efficiency in base stations. The system comprises one or more processors and one or more non-transitory computer storage media storing computer-usable instructions that, when used by the one or more processors, cause the one or more processors to perform a set of operations. The operations comprise determining a location of each user device of a first set of user devices served by a first base station and a location of each user device of a second set of user devices served by a second base station, wherein the first base station communicates to the first set of user devices using a first beamform and the second base station communicates to the second set of user devices using a second beamform. The operations further comprise accessing device capability information associated with at least a portion of the first set of user devices and the second set of user devices. The operations further comprise based at least in part on the locations of the user devices of the first and second sets of user devices and the device capability information, determining third and fourth beamforms such that when the third beamform is communicated from the first base station and the fourth beamform is communicated from the second base station, (a) the first and second base stations collectively consume less power compared to an amount of power collectively consumed by the first and second base stations when the first base station communicates the first beamform and the second antenna communicates the second beamform and (b) one or more network parameters associated with each user device of the first and second set of user devices exceed a predetermined threshold. The operations further comprise instructing the first base station to communicate one or more downlink signals using the third beamform and instructing the second base station to communicate one or more downlink signals using the fourth beamform Referring to the drawings in general, and initially to FIG. 1, an exemplary computing environment 100 suitable for practicing embodiments of the present technology is provided. Computing environment 100 is but one example, and is not intended to suggest any limitation as to the scope of use or functionality of the embodiments discussed herein. Neither should the computing environment 100 be interpreted as having any dependency or requirement relating to any one or a combination of components illustrated. It should be noted that although some components in FIG. 1 are shown in the singular, they may be plural. For example, the computing environment 100 might include multiple processors and/or multiple radios. As shown in FIG. 1, computing environment 100 includes a bus 102 that directly or indirectly couples various components together, including memory 104, processor(s) 106, presentation component(s) 108 (if applicable), radio(s) 116, input/output (I/O) port(s) 110, input/output (I/O) component(s) 112, and power supply 114. More or fewer components are possible and contemplated, including in consolidated or distributed form.

Memory 104 may take the form of memory components described herein. Thus, further elaboration will not be provided here, but it should be noted that memory 104 may include any type of tangible medium that is capable of storing information, such as a database. A database may be any collection of records, data, and/or information. In one embodiment, memory 104 may include a set of embodied computer-executable instructions that, when executed, facilitate various functions or elements disclosed herein. These embodied instructions will variously be referred to as "instructions" or an "application" for short. Processor 106 may actually be multiple processors that receive instructions and process them accordingly. Presentation component 108 may include a display, a speaker, and/or other components that may present information (e.g., a display, a screen, a lamp (LED), a graphical user interface (GUI), and/or even lighted keyboards) through visual, auditory, and/or other tactile cues.

Radio 116 may facilitate communication with a network, and may additionally or alternatively facilitate other types of wireless communications, such as Wi-Fi, WiMAX, LTE, and/or other VOIP communications. In various embodiments, the radio 116 may be configured to support multiple technologies, and/or multiple radios may be configured and utilized to support multiple technologies. The input/output (I/O) ports 110 may take a variety of forms. Exemplary I/O ports may include a USB jack, a stereo jack, an infrared port, a firewire port, other proprietary communications ports, and the like. Input/output (I/O) components 112 may comprise keyboards, microphones, speakers, touchscreens, and/or any other item usable to directly or indirectly input data into the computing environment 100. Power supply 114 may include batteries, fuel cells, and/or any other component that may act as a power source to supply power to the computing environment 10 or to other network components, including through one or more electrical connections or couplings. Power supply 26 may be configured to selectively supply power to different components independently and/or concurrently.

Figure 2:
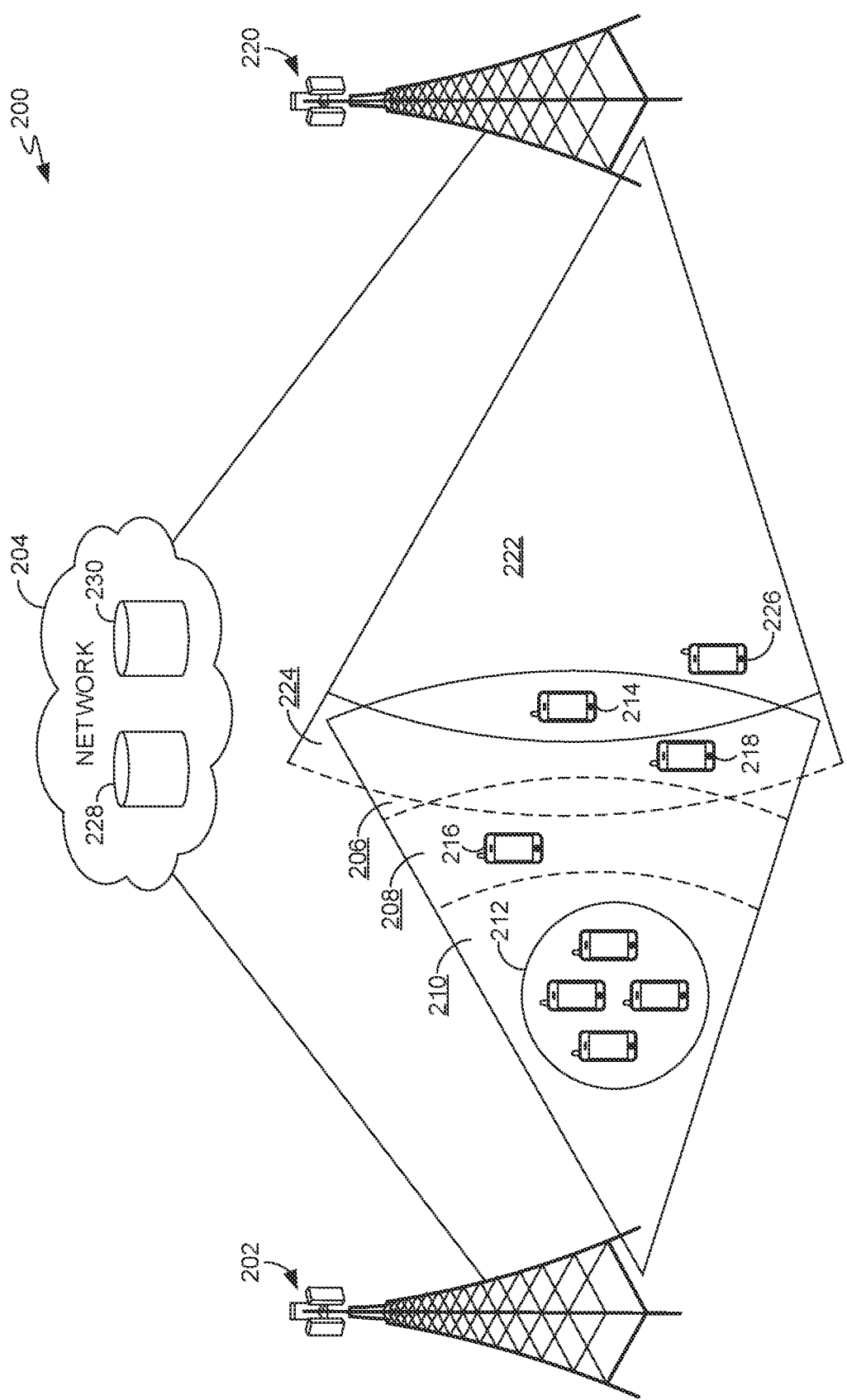
FIG. 2 illustrates a diagram of an exemplary network environment in which implementations of the present disclosure may be employed.

Turning now to FIG. 2, a representative network environment in which the present disclosure may be carried out is illustrated. Such a network environment is illustrated and designated generally as network environment 200. Network environment 200 is but one example of a suitable network environment and is not intended to suggest, including by the form of any illustrated component thereof, any limitation as to the scope of use or functionality of the invention. Neither should the network environment be interpreted as having any dependency or requirement relating to any one or combination of components illustrated. The network environment 200 generally represents a high-level model for wirelessly communicating between a base station and one or more wireless communication devices, referred to herein as user equipment (UE), as discussed in greater detail herein. At the highest level, the network environment 200 comprises at least a first base station 202, at least one UE, a network 204, and a propagation engine 230.

The network environment 200 comprises at least the first base station 202 that is configured to wirelessly communicate with one or more UEs, which may have any one or more aspects of the computing device 100 of FIG. 1. In some aspects of the present disclosure, the network environment 200 may additionally comprise a second base station 220. For the purposes of this disclosure, the term "base station" is used in its general sense, that is, a station for transmitting and/or receiving RF signals; accordingly, each of the first base station 202 and the second base station 220 may take the form of a cellular node (e.g. eNodeB, gNodeB, etc.), a relay, an access point (e.g., a Wi-Fi router), or any other desirable emitter and/or receiver of signals that transmits and/or receives wireless signals to/from one or more UEs. A suitable base station is not protocol-specific, it may be configured to be any wireless telecommunication protocol that is compatible with the first UE 204 and/or the second UE 206, such as 4G, 5G, 6G, 802.11x, or any other wireless standard. A suitable base station is also not exclusive to cellular telecommunication networks, it may take the form of any wireless communication system and used at any desirable frequency (e.g., microwave relays). Base stations consistent with the present disclosure may be configured to provide coverage to one or more geographic service areas, and will have one or more backhaul connections that connect it to a broader telecommunications and/or information network, such as the network 204, for the provision of telecommunication and/or information service(s) to one or more UEs. As illustrated, the base station 202 may take the form of a macro cell; however, each of the first base station 202 and the second base statin 220 may take any desirable form, such as a small cell, or a residential Wi-Fi router. As seen in the embodiment illustrated by FIG. 2, base stations suitable for use in the present disclosure may be terrestrial, that is, they are coupled to the earth via a tower or some other structure, such as the first base station 202; alternatively, a suitable base station may be extra-terrestrial, that is coupled to an aircraft or a satellite.

The network environment 200 comprises the network 204. The network 204 comprises any number of components that are generally configured to provide voice and/or data services to UEs that are wirelessly connected to the first base station 202 and/or the second base station 220. For example, the network 204 may comprise one or more additional wireless base stations, a core network, an IMS network, a PSTN network, or any number of servers, computer processing components, and the like. The network 204 may include access to the World Wide Web, internet, or any number of desirable data sources which may be queried to fulfill requests from wireless communication devices that make requests via the first base station 202 and/or the second base station 220. Though illustrated as within the network 204, the network environment may comprise a data repository 228 and a propagation engine 204 disposed in any location desirable by a mobile network operator; for example, data repository 228 may be located on its own, outside the core network and the propagation engine may be located at an edge of the network 204, at a base station such as the first base station 202 and/or the second base station 220, or any other location consistent with the present disclosure. Neither should the singularity of the illustration in FIG. 2 be literal, the data repository 228 may be divided among more than one locations/components. The data repository 228 may take any form accessible by the propagation engine 230 and/or additional components or network functions of the network environment 200 not illustrated and beyond the scope of the present disclosure; for example, the data repository 228 may be a unified data repository (UDR) of a 5G network. The data repository 228 is at least configured to store information relating to capabilities and locations of UEs within the network environment 200 and communicate said information said information to the propagation engine 230, as will be described in greater detail herein.

The network environment 200 comprises one or more UEs, which the one or more base stations of the network environment 200 connect to the network 204. Generally, a wireless connection is established between a base station such as the first base station 202 and a UE in order to provide the UE with telecommunication services requested by a subscriber. In various illustrative aspects, the network environment 200 may be said to comprise a set of UEs 212, a first UE 214, a second UE 216, a third UE 218, and a fourth UE 226, in various combinations. Each of the first base station 202 and the second base station 220 are configured to provide wireless telecommunication services to UEs in a particular geographic area, as a result of propagation characteristics of each particular base station. The propagation characteristics of a base station may be based on the maximum transmission power available to a transmitter, the receive gain of receivers, the quantity/arrangement of antenna elements accessible to the base station, and the ability of the base station to perform beam forming. That said, for the purposes of the present disclosure, it may be assumed that if all other propagation characteristic variables are kept constant except the transmission power, an increase in power will cause the downlink signals emitted by a base station to travel further and reach a UE that is more distant from said base station compared to when a lower power is used. In other words, a first amount of power used to transmit signals at a base station will cause said signals to reach further from the base station than a second amount of power, wherein the second amount of power is less than the first. Accordingly, the first base station 202 may be said to have a first geographic service area 206 when a first amount of power is used by the first base station 202 to transmit signals, a second geographic service area 208 when a second amount of power is used by the first base station 202 to transmit signals, and a third geographic service area 210 when a third amount of power is used by the first base statin 202 to transmit signals, wherein the third amount of power is less than the second amount of power and the second amount of power is less than the first amount of power, and wherein the third geographic service 210 area extends less distance from the first base station 202 than the second geographic service area 208 and the second geographic service area 208 extends less distance than the first geographic service area 206. In aspects of the network environment 200 that comprise the second base station 220, the second base station 220 may be said to have a fourth geographic service area 222 when a fourth amount of power is used by the second base station 220 to transmit signals and a fifth geographic service area 224 when a fifth amount of power is used to transmit signals, wherein the fifth amount of power is greater than the fourth amount of power, and wherein the fifth geographic service 224 area extends further from the second base station 220 than the fourth geographic service are 222.

The network environment 200 utilizes the propagation engine 230 to make power decisions and modify transmission power and/or other propagation characteristics of one or more base stations based on the location of at least a portion of the UEs in the network environment and the capabilities of at least some of the UEs in the network environment. As will be discussed in greater detail, the propagation engine 230 may make and communicate propagation instructions that are specific to a single base station or may make and communicate propagation instructions that directly modify two or more base stations as part of a single solution.

The propagation engine 230 is configured to modify one or more propagation characteristics of a base station to reduce transmission power of the base station without causing a UE to lose service, based on the location of the UE and the device capabilities of that UE. Take, for example, a hypothetical of the network environment 200 wherein the network environment 200 comprises the first base station 202, the second UE 216, and the third UE 218. In a conventinal operating condition, the first base station 202 is configured to communicate with a plurality of UEs in the first geographic service area 206. Each of the second UE 216 and the third UE 218 report their geolocation to the first base station 202, which communicates the information to the propagation engine 230 directly or to one or more locations, such as the data repository 228, of the network 204 which is accessible by to the propagation engine 230. Device location information may be in any form desirable for a mobile network operator, such as a GPS or other geolocation provided by a geolocation sensor (e.g., a GPS sensor/module) or ranging information (e.g., a distance estimate from a bases station, such as using RSRP values).

The propagation engine 230 is further configured to obtain device capability information for one or more of the second UE 216 and the third UE 218, for example by querying the data repository 228 upon which said device capability information may be stored (e.g., a profile store). The device capability information relates to the abilities of the UE to process signals from the first base station 202. In a first aspect, the device capability information may relate to the receive gain or other RF and/or processing specifications of a particular UE's and/or its components based on a make/model of the device; for example, device capability information of the second UE 216 may indicate that it has a receive antenna gain of 21 dBi and that the third UE 218 has a receive antenna gain of 24 dBi—based on a device type or make/model information of each of the second UE 216 and the third UE 218. In another aspect, the device capability information may additionally or alternatively comprise historical performance information comprising a receive signal strength (or any one or more KPIs such as RSRP, RSRQ, average SINR, and the like) as a factor of distance from a base station and the transmission power used to transmit downlink signals from said base station. In a first example, device capability information associated with the second UE 216 may indicate that when a base station transmits downlink signals at 100 Watts (W), the second UE 216 has a receive signal strength (e.g., Reference Signal Receive Power (RSRP)) of −120 dBm when the second UE 216 is 2500 m from said base station and device capability information associated with the third UE 218 may indicate that under the same circumstances (located 2500 m from a base station transmitting at 100 W) that the third UE 218 has a receive signal strength of −117 dBm. In yet other aspects, a machine learning model, trained on similar historical data can be used to estimate the downlink transmission power at which a particular UE (or a UE having a particular make/model) will have at least a threshold minimum receive signal strength (or other KPI(s)).

Based on a combination of the device location information and the device capability information of the second UE 216 and the third UE 218, the propagation engine 230 may determine that the first base station 202 can reduce its transmission power from the first amount of power (e.g., 125 W) to the second amount of power (e.g., 103 W), causing its downlink signal range to be reduced from the first geographic service area 206 to the second geographic service area 208, wherein the second geographic service area 208 is defined as the boundary at which each of the second UE 216 and the third UE 218 have a receive signal strength above a predetermined threshold (e.g., 120 dBm). Restated, the third UE 218 may be located outside the second geographic service area 208 and continue to be attached to the first base station 202 based on its better device capabilities while the second UE 216 must be located inside the second geographic service area 218 in order for both the second UE 216 and the third UE 218 to usably be attached to the first base station 202.

The propagation engine 230 is configured to make propagation decisions for a plurality of base stations, in order to optimize the downlink power used to serve a plurality of UEs in a multi-base station environment. In addition to the previous hypothetical, consider that the network environment further comprises the first UE 214 and the fourth UE 226, wherein under a conventional condition the first base station 202 is used to provide wireless telecommunication coverage to the first geographic service area (comprising each of the first UE 214, the second UE 216, and the third UE 218) and the second base station 220 is used to provide wireless telecommunication coverage to the fourth geographic service area 222 (comprising the fourth UE 226). Based on a combination of the device location and device capability information for the first UE 214, the propagation engine 230 may determine that the first UE 214 is capable of being handed over to the second base station 220 without causing the receive signal strength of the first UE 214 to drop below the predetermined minimum, instead of being attached to the first base station 202, which may have been selected/re-selected based on a determination that the first UE 214 had a greater receive signal strength from the first base station 202 than the second base station 220. In such a set of circumstances, the propagation engine 230 may determine that the first base station 202 can reduce its transmission power from the first amount of power (e.g., 125 W) to the second amount of power (103 W) and that the second base station 220 can maintain its fourth amount of power (e.g., 125 W)—resulting in each of the first, second, third, and fourth UEs having greater than the predetermined threshold receive signal strength and reducing the overall base station transmission power from 250 W to 228 W. Alternatively, the propagation engine 230 may determine that the first base station 202 can stop transmitting downlink signals (e.g., based on a determination that there are no UEs nearer to the first base station than the second UE 216 or an operational factor such as an outage at the first base station 202 or a need for the first base station 202 to enter a maintenance period) and each of the first UE 214, the second UE 216, and the third UE 218 can be handed off to the second base station 220 as a result of increasing the transmission power of the second base station from the fourth amount of power (e.g., 125 W) to the fifth amount of power (e.g., 175 W), causing each of the first UE 214, the second UE 216, and the third UE 218 to be within the fifth geographic service area 224—resulting in each of the first, second, third, and fourth UEs having greater than the predetermined threshold receive signal strength and reducing the overall base station transmission power between the first base station 202 and the second base station 220 from 250 W to 175 W.

The propagation engine 230 is configured to identify sets of devices in an effort to make efficient power management decisions. Adding to the previous hypothetical, consider that the network environment 200 further comprises a plurality of UEs disposed near the first base station 202. Using device location information, the propagation engine 230 can identify/define the first set of devices 212. In such a circumstance, the propagation engine 230 may determine that a third amount of power (e.g., 50 W) can be used by the first base station 202 to transmit signals to the first set of devices 212, resulting in the first base station 202 serving devices in the third geographic service area 210. In order not to leave other devices that were previously served without service, the propagation engine 230 may cause the second base station 220 to increase its transmission power from the fourth amount to the fifth amount, increasing its coverage area to the fifth geographic services area 224—which results in each of the first, second, third, and fourth UEs having at least the predetermined threshold receive signal strength, and with an overall power expenditure of 225 W (compared to 250 W with no modifications).

As illustrated by the preceding hypotheticals, the propagation engine 230 may be configured, in some aspects to prioritize overall reduction in base station transmission power as the primary factor, ensuring only that each UE in the network environment 200 has at least a minimum threshold receive signal strength. In other aspects, the propagation engine 230 may be configured for less aggressive power savings by providing for a higher predetermined threshold receive signal strength—equating to a presumptively higher quality of service for at least some of the plurality of UEs in the network environment, and with less overall power savings.

The propagation engine 230 may be configured to restore service after a predetermined period of time, after propagation decisions have been implemented by a base station. In an instance where the first base station 202 is instructed to reduce its transmission power from the first amount of power, a new UE may enter the first geographic service area 206 beyond the range of the now-modified coverage area of the first base station 202. In order to make sure that such a UE is appropriately served, the propagation engine 230 may instruct the first base station 202 (or the first base station 202 may, on its own) at least momentarily re-increase its power after the conclusion of a restore timer (configurable by the mobile network operator or preset) to communicate synchronization or other signaling to the first geographic service area which may be used by such a UE to attach or make cell selection decisions. If, after the momentary restoration of power, no UEs are detected or attach to the first base station 202, the first base station 202 can continue to transmit signals using the modified transmission power; however, if, after the momentary restoration of power, at least one UE is detected in the first geographic service area that was not previously known, the propagation engine 230 can re-determine transmission powers according to one or more aspects already described.

Figure 3:
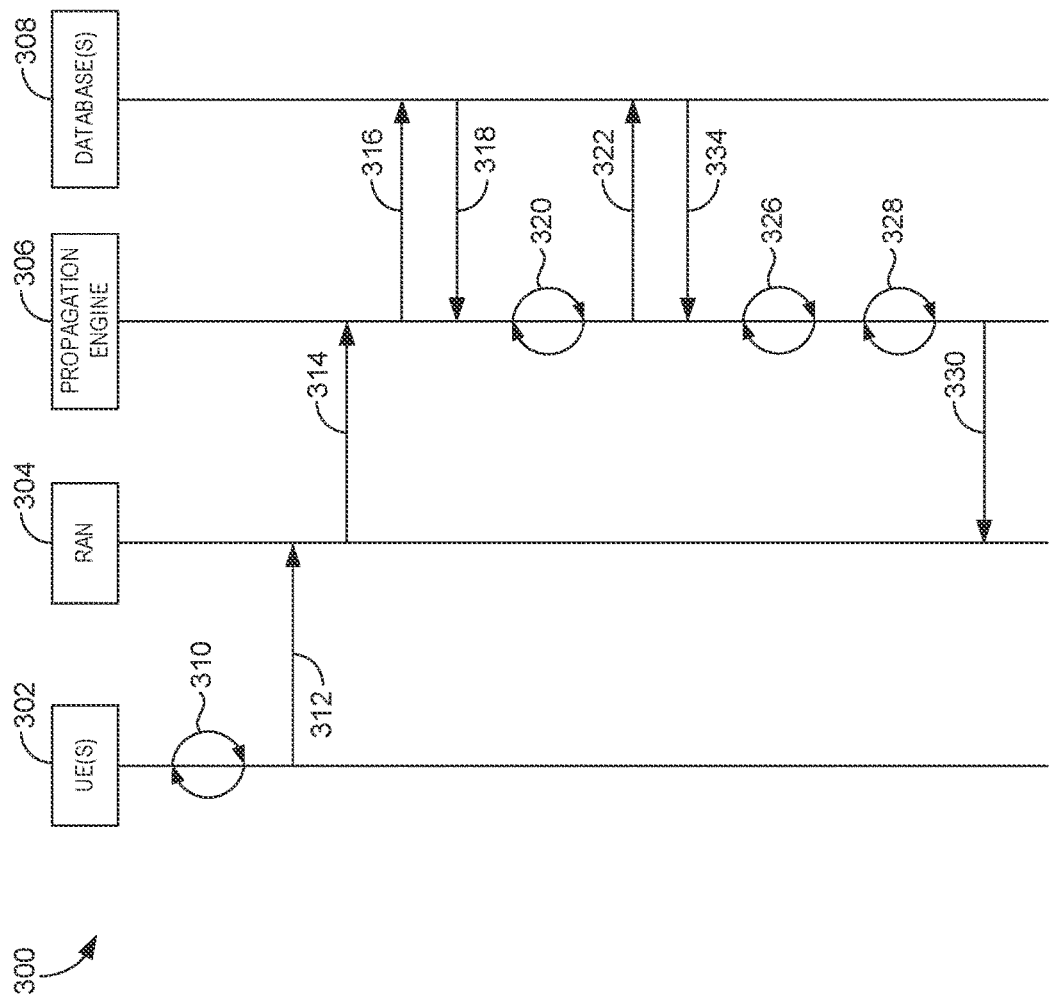
FIG. 3 illustrates a flow diagram of an exemplary method for performing one or more aspects of the present disclosure.

Turning now to FIG. 3, an illustrative example of a flow of the present disclosure is illustrated as method 300. The method 300 comprises a UE 302 determining its geolocation at a first step 310, whether by way of a positioning sensor such as GPS or by performing signal measurement processes such as measuring one or more reference signals from a radio access network 304. At a second step 312, the UE 302 communicates its position information to the RAN 304. At a third step 314, the RAN 304 communicates the location information of the UE 302 and any other compiled UE location reports to a propagation engine 306, having any one or more aspects of the propagation engine 230 of FIG. 2. At a fourth step 316, the propagation engine 306 communicates a query to a database 308 to determine network configuration information associated with the RAN 304, wherein the network configuration information comprises current downlink transmission characteristics and at least in some aspects a list of all UEs presently attached to the RAN 304. At a fifth step 318, the database responds to the query of step 316 with the available information. At a sixth step 320, the propagation engine assesses one or more propagation thresholds, comprising determining a minimum threshold for one or more network parameters associated with the downlink from the RAN 304 to the UE 302. At a seventh step 322, the propagation engine 306 communicates an enquiry to a database 308 to obtain device capability information of the UE 302, wherein the device capability information comprises one or more indications of the UE 302's ability to receive and process downlink signals or its historical performance vis-à-vis distance and downlink transmission power, according to any one or more aspects described with respect to FIG. 2. At an eighth step 324, the database 308 responds to the propagation engine 306 with the device capability information of the UE 302. At a ninth step 326, the propagation engine 306 compiles the UE location and capability information. At a tenth step 328, the propagation engine 306 determines a propagation power adjustment based on the compiled location and device capability information, according to any one or more aspects described with respect to FIG. 2. At an eleventh step 330, the propagation engine 306 communicates a transmission power instruction to the RAN 304, wherein the transmission power instruction comprises a change to the power used by the RAN 304 to transmit downlink signals to one or more UEs, such that one or more network parameters of the downlink connection between the RAN 304 and the UE 302 remain at or above a predetermined minimum threshold, according to any one or more aspects described with respect to FIG. 2.

Figure 4:
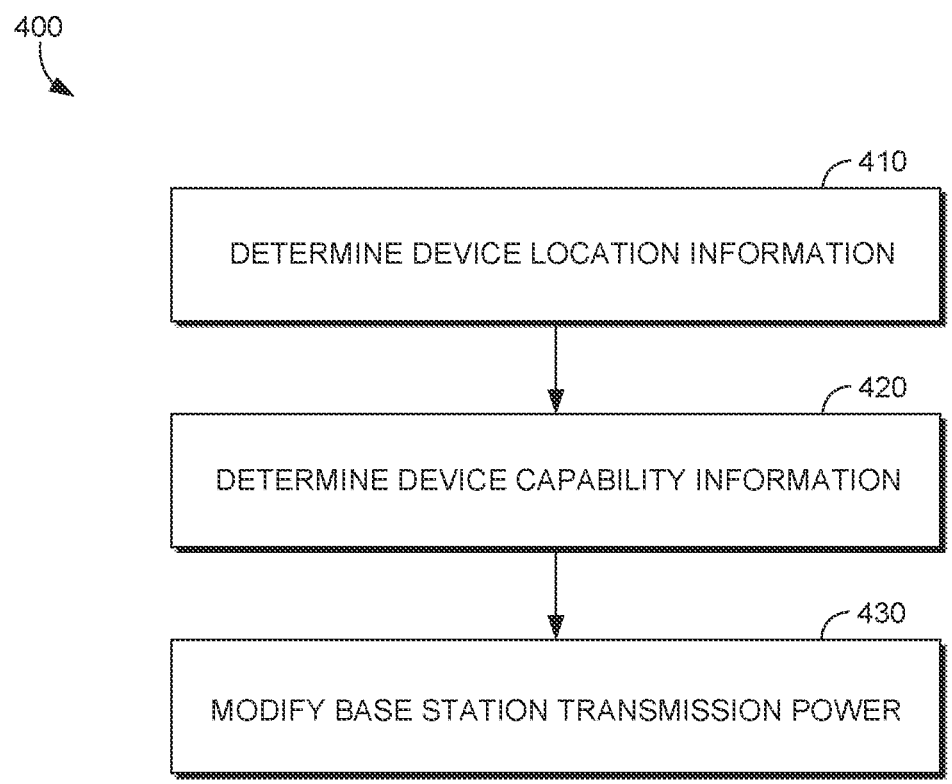
FIG. 4 illustrates a flow diagram for modifying transmission power of base stations, according to one or more aspects of the present disclosure.

Turning now to FIG. 4, a method 400 is depicted for improving the power efficiency of a base station. At a first step 410, the method 400 comprises determining a device location of a UE, according to any one or more aspects described with respect to FIGS. 2-3. At a second step 420, the method 400 comprises determining device capability information for a UE, according to any one or more aspects described with respect to FIGS. 2-3. At a third step 430, the method 400 comprises determining a modified base station transmission power of a base station, based at least in part on the device location information and the device capability information, such that when a set of downlink signals are communicated from the base station to the UE with the modified base station transmission power, one or more network parameters of the downlink between the base station and the UE meet or exceed a predetermined minimum threshold—according to any one or more aspects of FIGS. 2-3.

Many different arrangements of the various components depicted, as well as components not shown, are possible without departing from the scope of the claims herein. Embodiments of the technology have been described with the intent to be illustrative rather than restrictive. Alternative embodiments will become apparent to readers of this disclosure after and because of reading it. Alternative methods of implementing the aforementioned subject matter may be performed without departing from the scope of the claims herein. Certain features and sub-combinations are of utility and may be employed without reference to other features and sub-combinations, which is contemplated as within the scope of the claims.

What is claimed is:

1. A method for improving power efficiency of base stations, the method comprising:
   determining device location information of at least a portion of one or more user devices served by an access point emitting a first beamform;
   accessing device capability information associated with at least a portion of the one or more user devices served by the access point;
   based on the device location information and the device capability information, determining a second beamform such that when the second beamform is emitted from the base station, (a) the base station consumes less power compared to an amount of power consumed by the base station when emitting the first beamform and (b) one or more network parameters associated with a device of the plurality of user devices exceed a predetermined threshold; and
   emitting the second beamform from the base station.

2. The method of claim 1, wherein the antenna information comprises an antenna gain.

3. The method of claim 2, wherein the one or more network parameters comprise a strength of a cellular signal received by the device from the base station.

4. The method of claim 3, wherein the second beamform serves a first user equipment (UE) and a second UE, wherein the first UE is more proximate to the base station than the second UE, and wherein the second UE has greater antenna gain than the first UE.

5. The method of claim 4, wherein the first UE and the second UE register the same strength of the cellular signal received from the base station, and wherein the one or more network parameters associated with the first UE would be less than the predetermined threshold if it were in a location of the second UE.

6. The method of claim 1, wherein the locations of each user device of the plurality of user devices are determined using measurement report data transmitted by each user device of the plurality of user devices.

7. The method of claim 1, wherein the antenna information is accessed from a profile store.

8. A system comprising:
one or more processors; and
one or more non-transitory computer storage media storing computer-usable instructions that, when used by the one or more processors, cause the one or more processors to:
determine a location of each user device of a first set of user devices served by a first base station and a location of each user device of a second set of user devices served by a second base station, wherein the first base station communicates to the first set of user devices using a first beamform and the second base station communicates to the second set of user devices using a second beamform;
access device capability information associated with at least a portion of the first set of user devices and the second set of user devices;
based at least in part on the locations of the user devices of the first and second sets of user devices and the device capability information, determining third and fourth beamforms such that when the third beamform is communicated from the first base station and the fourth beamform is communicated from the second base station, (a) the first and second base stations collectively consume less power compared to an amount of power collectively consumed by the first and second base stations when the first base station communicates the first beamform and the second antenna communicates the second beamform and (b) one or more network parameters associated with each user device of the first and second set of user devices exceed a predetermined threshold;
instruct the first base station to communicate one or more downlink signals using the third beamform; and
instruct the second base station to communicate one or more downlink signals using the fourth beamform.

9. The system of claim 8, wherein the first base station consumes less power when communicating the third beamform as compared to the first beamform, and wherein the second base station consumes more power when communicating the fourth beamform as compared to the second beamform.

10. The system of claim 9, wherein the communication of the third and fourth beamform causes a second user device of the first plurality of user devices to be served by the second base station instead of the first base station.

11. The system of claim 8, wherein the device capability information associated with each user device of the first set of user devices and the device capability information associated with each user device of the second set of user devices comprise antenna gain information.

12. The system of claim 8, wherein the locations of each user device of the first and second pluralities of user devices are determined using measurement report data transmitted by each user device of the first and second sets of user devices.

13. The system of claim 8, wherein the one or more network parameters comprise a strength of a cellular signal received by the first user device from the first base station.

14. The system of claim 8, wherein the device capability information associated with each user device of the first and second sets of user devices comprises historical signal strength measurements of downlink signals as a factor downlink transmission power and distance from a transmitting base station.

* * * * *